United States Patent
Peep et al.

[15] 3,656,342
[45] Apr. 18, 1972

[54] WATER WAVE FOLLOWER

[72] Inventors: Mart Peep; Ronald J. Flower, both of Baltimore, Md.

[73] Assignee: The United States of America as represented by the Secretary of the Navy

[22] Filed: Dec. 9, 1970

[21] Appl. No.: 96,515

[52] U.S. Cl....................................73/170 R, 73/170 A
[51] Int. Cl............................................G01w 1/00
[58] Field of Search..........................73/170 R, 189, 170 A

[56] References Cited

OTHER PUBLICATIONS

An article titled " Instrument for Measuring Water Waves" by C. G. Whittenbury et al. from The Review of Scientific Instruments, pp. 674–676 of Vol. 30, No. 8, August 1959

*Primary Examiner*—James J. Gilu
*Attorney*—R. S. Sciascia, Arthur L. Branning and Sol Sheinbein

[57] ABSTRACT

A hydraulically operated, electronically controlled servomechanism wave follower to hold anemometers at fixed distances above the water surface to measure the wind field close to the surface. A wave probe mounted on the wave follower senses the water level, relays this data to an electrical control network which operates on a servo valve, enabling hydraulic fluid to raise or lower the wave probe and anemometer to the desired height.

5 Claims, 2 Drawing Figures

INVENTORS
MART PEEP
RONALD J. FLOWER

WATER WAVE FOLLOWER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In studies of wave generation an exploration of the wind field close to the water surface is critical. Previous work in the field of air-sea interactions has often been limited by the problem of measuring the velocity field of the air in the layer immediately above the water surface since the surface is continually in motion. Most measurements have been taken with anemometers at fixed positions above the mean water surface. These measurements yield little information about the velocity field inside the wave troughs. In addition, most estimates of the curvature of the wind profile have been deduced from data provided by vertical arrays of fixed anemometers. These measurements seldom have enough spatial resolution to define the shape of the wind profile accurately very near the water surface. Measurements from an instrument which holds a sensor very close to the water surface while following this surface may be expected to yield new insight into the problem of momentum and energy transfers from air to sea. To be practical, such an instrument must be suited to field operations, and it should disturb the velocity field of the air as little as possible. An electrical servomechanism used as a laboratory wave follower for small-amplitude waves with frequencies up to 1 Hz as described in Shemdin and Hsu in Stanford University Tech. Report 66 did not have a frequency response high enough for in situ air-sea interaction studies.

SUMMARY OF THE INVENTION

The present invention has overcome the disadvantages of prior sensing devices and provides a wave follower comprising an anemometer and a wave probe mounted on a bracket attached to a movable piston rod. The wave probe detects the wave height and causes the frequency of a tuned oscillator to vary with a varying wave height. The oscillator output produces a DC output signal which is compared with the desired DC signal and any error between the two signals actuates a servo valve which allows hydraulic fluid to move the piston rod up or down until the error signal is extinguished. Provision is also made for varying the height of the wave probe without following the wave motion.

OBJECTS OF THE INVENTION

It is therefore an object of the present invention to provide a wave follower capable of maintaining an element at selected fixed distances above the water surface.

Another object of the present invention is to provide a wave follower capable of moving a probe slowly and continuously without following the wave motion.

Yet another object of the present invention is to provide a wave follower having a high force to weight ratio.

A still further object of the present invention is to provide a device for tracking and recording wind velocity close to the surface of an ocean.

A still further object of the present invention is to provide a portable wave follower capable of making wind measurements in troughs of waves.

Yet another object of the present invention is to provide a device capable of tracking a random wind sea.

DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT

Figure 1:
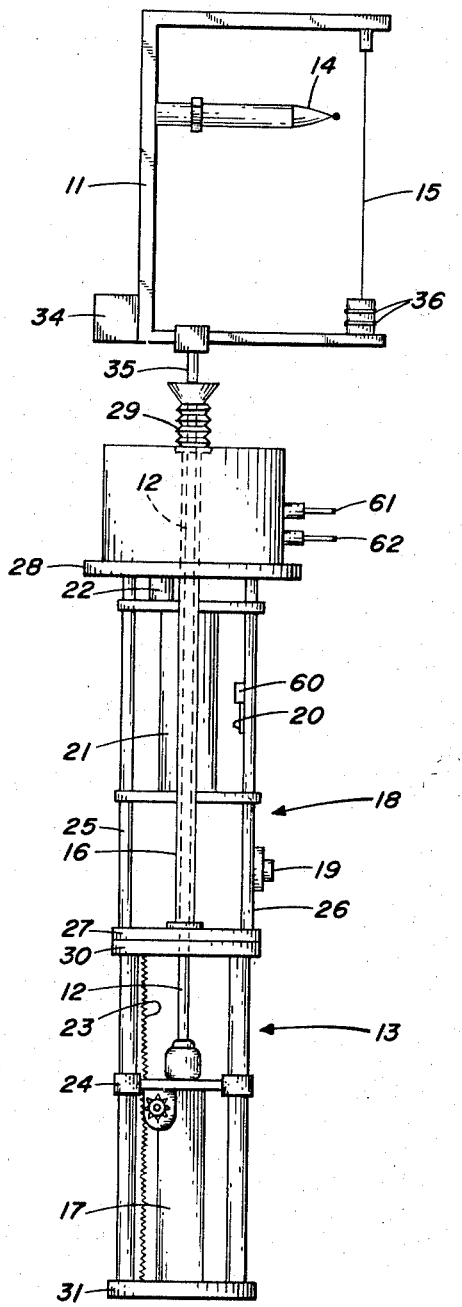
FIG. 1 is a side elevation in section of the wave follower of the present invention.

Referring now to FIG. 1 there is shown a portable wave follower which is to be mounted on a support immersed in water, though a bouyant device may be attached to it instead. A nulling probe bracket 11 is mounted on the end of a piston rod 12, which extends vertically out of wave follower chassis 13. Nulling probe bracket 11 holds both anemometer 14 and nulling wave probe 15 and is designed to be easily detachable from the piston rod 12. The bracket 11 itself contains a nulling probe oscillator 32 and mixer 33 in a watertight housing 34 near its base. Electric contact with the wires in the piston rod is made by four connector underwater coupling 35. Nulling probe 15, preferably a Kynar cover computer wire, is sealed to the bracket 11 by O-rings 36. Anemometer probe 14 is a DISA type 55A81.

Chassis 13 is assembled around hydraulic cylinder 16 and the electric components 17 and hydraulic components 18 are mounted on the chassis. The hydraulic section 18 contains servo valve 19, bypass valve 20, accumulator 21, water collecting bottle 22, and the body of the hydraulic cylinder 16. The hydraulic cylinder 16 is double acting double ended with a modified stainless steel piston rod which runs in a 1-inch bore. A small hole is drilled axially through the piston rod 12 to accomodate cables from the wave probe 15 and anemometer 14. The bypass valve 20 is a rotary hydraulic valve driven by an electric motor 60. The bypass valve 20 allows hydraulic power to be cut off briefly from the system when adjustments are necessary. Servo valve 19 directs flow in two directions while controlling the flow rate in the hydraulic cylinder 16. Accumulator 21 acts to reduce transients imposed on the hydraulic lines by the servo valve 19 and to store fluid which can be used to meet peak flow demands. It also prevents damage to hose and tubing from water hammer effects.

The hydraulic section 18 is assembled on three aluminum rods, two of which are represented in the Figure as 25, 26 held together by two aluminum end plates 27, 28 forming a watertight case. Hydraulic cylinder 16 is bolted between these two end plates 27, 28 and rod 12 extends through holes in each. A collapsible boot, or bellows, of rubberlike material, 29 covers the rod 12 and seals it against sea water. The boot 29, being constantly flexed by the rod 12, must be relieved of air pressure and thus a hole is drilled at the top of the chassis 13 through which the boot vents air into the case. Water collecting bottle 22 is located beneath the boot 29 to catch any water reaching the interior of the chassis 13 through a possible leak in the boot. A sensor in the collecting bottle 22, when wetted, actuates an alarm which can compress the boot 29 to retard the entry of more water.

One end of piston rod 12 extends out of chassis 13 and the other end of the rod extends into the lower, or electronic section 17 which contains the electronics and spider 24. The electronic section 17 is arranged similarly to the hydraulic section 16 except that there are six rods, three aluminum and three stainless steel serving as bearing surfaces for the spider 24, to be described infra. Most of the electronic system is mounted in an aluminum plate which is secured to one of the aluminum rods. The rods are held together by two end plates 30, 31.

OPERATION

Figure 2:
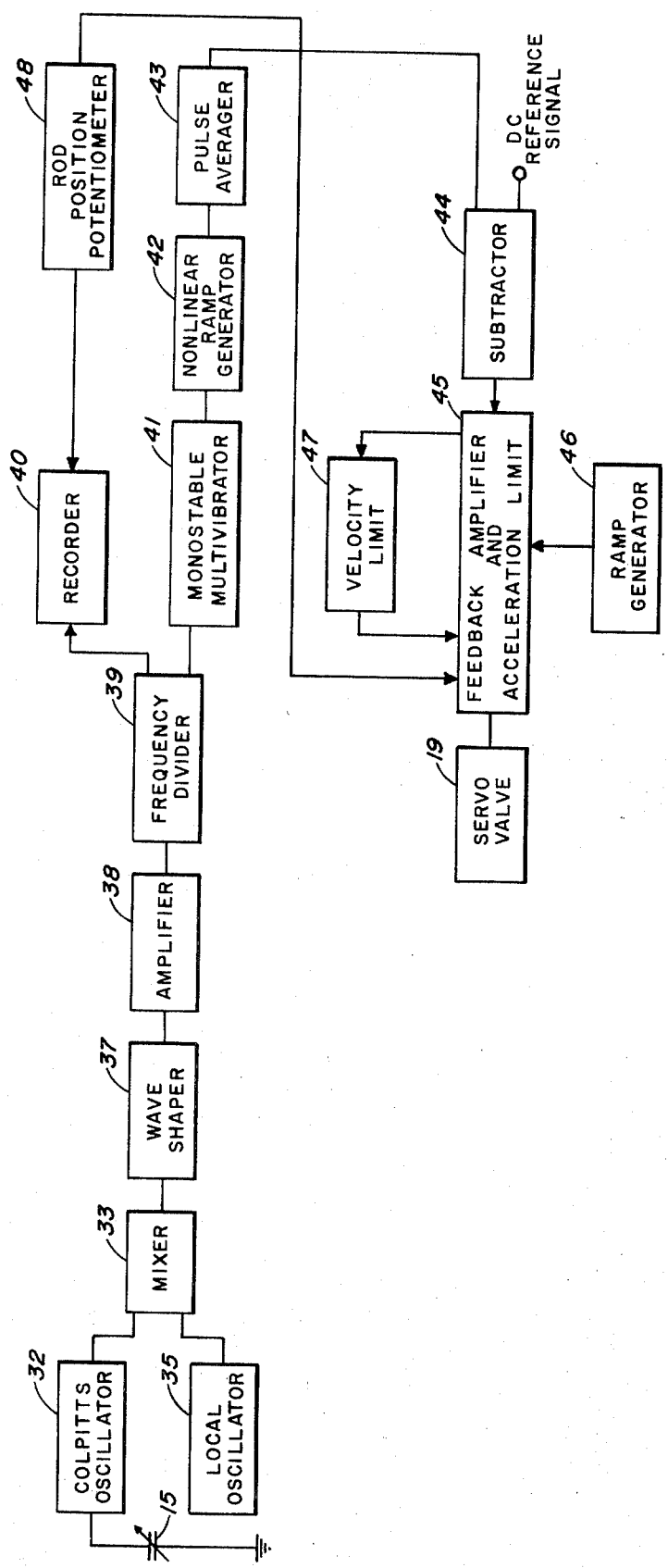
FIG. 2 is a block diagram of the electrical components of the invention.

Referring now to FIG. 2, the capacitance of wave probe 15 varies with water level and forms part of a tuned circuit in oscillator 32. Oscillator 32, which may be a Colpitts oscillator, operates over the range from 1.923 MHz to 1.962 MHz with the probe capacitance varying from 0 to 300 pf depending on the wave height. The output of oscillator 32 is mixed with a crystal controlled local oscillator 35, having a frequency of 1.92 MHz in mixer 33, the mixer output producing intermediate frequencies (IF's) covering the range 3 to 42 KHz. The IF's are wave shaped in wave shaper 37, and the signals are then sent down through the piston rod 12 to the electronic section 17 where they are amplified in amplifier 38, divided by eight in a frequency divider 39 and recorded in recorder 40 for future reference or immediate transmission. The divided signals also trigger monostable multivibrator 41 which in turn triggers nonlinear ramp generator 42 whose output is integrated in pulse averager 43 to produce a linear DC output signal to subtractor 44. As the wave height increases, the frequency of oscillator 32 decreases, resulting in a higher DC output signal. A DC reference signal, representative of the desired position of the water surface at wave probe 15 supplies the other input to subtractor 44 whose output indicates the error between the actual probe 15 height and the desired probe height. This error is fed to feedback amplifier and acceleration limit 45 which controls the servo valve 19. Valve 19 is actuated to supply hydraulic fluid from a source (not shown) through hydraulic cables 61, 62 to the hydraulic cylinder 16 whereby the rod 12 is either caused to move up or down until the error signal from the feedback amplifier 44 is extinguished. Acceleration limit 45 is provided to reduce transients in the hydraulic system. Such transients may occur naturally, for example, when water beads on the wave probe or they may occur when the mode of operation is changed, for example, from following to vertical scan to be described infra. Two operational amplifiers may form an acceleration limiting system.

A velocity limiter 47 permits the wave follower to correct for initial misalignment at safe speeds. Thus, if the velocity of rod 12, i.e., the voltage from feedback amplifier 45, becomes too high, the velocity sensor senses the condition and slows the piston to a lower velocity.

Attached to the spider 24 and driven by a rack 23 fixed to one of the bearing rods of the electronic section, is a dual section potentiometer (not shown). It provides a voltage proportional to the position of the piston rod 12 and its signal is recorded in recorder 40. It also supplies a signal to an end stop sensor whereby an end stop is created by decreasing the gain of feedback amplifier 45. As with the velocity limit, the velocity of the piston rod 12 is decreased.

The wave probe is also capable of moving the probe bracket 11 slowly and continuously in the vertical without following the wave motion. This slow vertical scan is secured by using a ramp generator 46 as the input to feedback amplifier 45 (which also operates as a differential amplifier) with feedback provided by position potentiometer 48 instead of the wave probe 15. This causes the piston rod to move up or down at a slow and constant velocity in the vertical drift mode. A rotation mechanism may be incorporated near the spider 24 for rotating the piston rod and the anemometer 14 through 360° about its zero position by remote control when wind direction changes.

It will be recognized that many modifications and variations of the present invention are possible in the light of the above teachings. For example, bellows 29 and water collecting bottle 22 can be eliminated if desired, and chassis 13 can break into two sections, one containing the hydraulic components 18 and the other containing the electronic components 17 for easy disassembly in the event that field repairs become necessary. A two- or three-axis anemometer, or any other small sensor, may be substituted for a single channel anemometer. The source of hydraulic fluid may be inclined with the wave follower or on a separate device. A high-resolution wave probe can be substituted if very small waves riding on larger waves are to be studied. It is therefore to be understood that within the scope of the appended claims the invention may be practiced otherwise than as specifically described.

What is claimed and desired to be secured by Letters Patent of the United States is:

1. A water wave follower comprising:
 a chassis;
 a double acting, double ended hydraulic cylinder within said chassis;
 a movable rod within said hydraulic cylinder;
 a wave probe mounted on said movable rod, adapted to extend above the surface of the water, and producing a signal indicative of the wave height;
 electrical control means coupled to said wave probe;
 hydraulic means coupled to said electrical control means adapted to move said rod up or down;
 whereby said wave probe signal actuates said electrical control means to operate on said hydraulic means to raise or lower said rod until said probe is maintained at a fixed distance relative to said wave.

2. A wave follower as recited in claim 1, wherein:
 said wave probe comprises a wire whose capacitance varies with wave height, said capacitance forming part of a tuned oscillator circuit;
 said electrical control means operating on said hydraulic means whenever said probe capacitance varies from the desired capacitance representing said fixed distance;
 said hydraulic means comprises a servo valve adapted to allow hydraulic fluid to enter said hydraulic cylinder.

3. A wave follower as recited in claim 2, said electrical control means comprising:
 a local oscillator;
 a mixer to mix said tuned oscillator signal with said local oscillator signal;
 a one shot multivibrator coupled to said mixer;
 a ramp generator coupled to said multivibrator;
 a pulse averager coupled to said ramp generator for producing a DC output signal representative of said wave height;
 a DC reference signal representing the desired position of said wave probe;
 subtractor means coupled to said pulse averager and said reference signal for comparing said DC signals and producing an error signal if said DC signals differ; and
 feedback amplifier means coupled between said subtractor means and said servo valve for controlling said servo valve until said error signal is extinguished.

4. A wave follower as recited in claim 3, including:
 means for recording said rod position and said wave probe signal;
 means coupled to said feedback amplifier for preventing said error signal from moving said rod at too great a speed; and
 means coupled to said feedback amplifier for moving said rod at a constant speed irrespective of said wave height.

5. A wave follower as recited in claim 4, including:
 an anemometer mounted on said movable rod for measuring the wind at a fixed distance above said wave; and
 means for rotating said rod about its axis.

* * * * *